July 31, 1951 — A. T. HURTER — 2,562,427
TWIN SCREW MECHANICAL FEEDER
Filed April 16, 1948 — 2 Sheets-Sheet 1

INVENTOR
A.T. HURTER
BY Fetherstonhaugh & Co.
ATTORNEYS

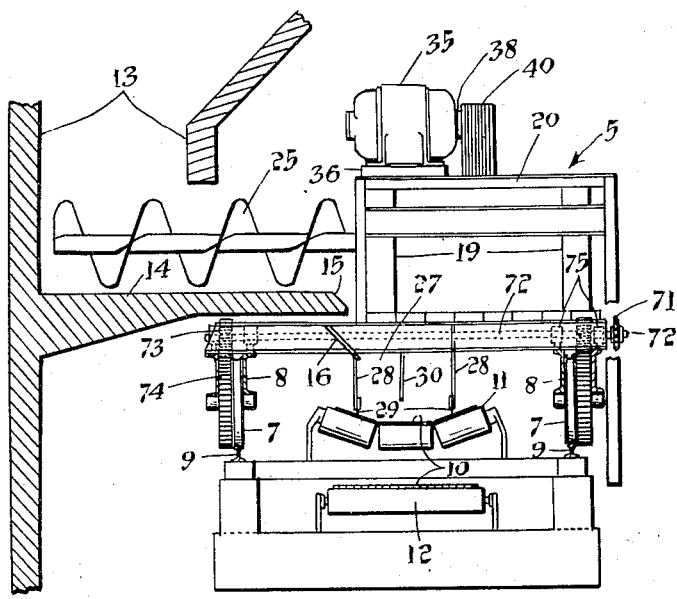

Patented July 31, 1951

2,562,427

UNITED STATES PATENT OFFICE 2,562,427

TWIN SCREW MECHANICAL FEEDER

Alfred T. Hurter, Montreal, Quebec, Canada, assignor to Stadler, Hurter & Company, Montreal, Quebec, Canada Application April 16, 1948, Serial No. 21,352

22 Claims. (Cl. 214—17)

This invention relates to mechanical feeder for extracting wood chips or other material from a bin or storage compartment and delivering same to a conveyor means.

A particular object of this invention is to provide a feeder mechanism comprising a pair of screw conveyors which project laterally from a supporting carriage into a storage bin, said screw conveyors being adapted to feed the contents of said bin to a conveyor means by rotation of the screw conveyors, preferably in opposite directions.

Another object of this invention is to provide a self-propelled feeder mechanism carriage adapted to travel along tracks provided therefor alongside of a storage bin, and adapted to straddle a conveyor belt, said carriage being provided with laterally projecting screw conveyors which are arranged to feed the material from the bin to the conveyor belt by rotation of the screws, preferably in opposite directions.

A further object is to provide a feeder mechanism of the character described with reversible driving means, actuated by the rotating screw conveyors, for moving the carriage in either direction along the tracks provided therefor during the feeding operation of the material from the bin to the conveyor belt.

A still further object is to provide a pair of screw conveyors which are adjustable as to distance between centres for varying the capacity of the feed of material.

A still further object of this invention is to provide novel means for arranging the chips or other material on the conveyor belt so as to balance the load on said conveyor belt.

The feeder mechanism is a self-propelled unit straddling a conveyor belt and mounted on tracks which extend the full length of the storage bin. The material is drawn from the storage bin over a platform which extends the length of the bin and is deposited on the conveyor belt by the oppositely rotating screw conveyors which are adjustably mounted on the carriage of the feeder mechanism to project laterally into the bin.

This arrangement is particularly advantageous, since the storage bin does not have to be built over the pulpwood digester. Thus one or more chip storage bins may be located any convenient distance from the digester and these bins may be constructed to any desired capacity at a relatively low cost as compared to one which would have to be erected over the digester. A single endless conveyor belt can be extended to the remote end of the furthest storage bin so as to carry the chips to the digester. The twin screw conveyor mechanism embodying this invention is arranged to straddle the conveyor belt so as to travel back and forth along tracks provided therefor to continuously feed the chips or other material from the bin, or bins, to the conveyor belt independently of the advancing movement of the belt towards the digester.

One advantage in providing screw conveyors which are adjustable as to the distance between centres is so that the feed of chips may be regulated according to the capacity of the conveyor belt. In this connection it is pointed out that the varying capacity of the chip feed is in proportion to the distance between centres of the screw conveyors. Thus, at a maximum spacing of the screw conveyors, the feeding capacity will be greatest. Then again, the variation as to distance between centres of the screw conveyors also takes care of the other conditions such as wet or closely packed chips. In such cases it is usually desirable to shorten the distance between centres of the screw conveyors to decrease the capacity of the chip feed to avoid overloading of the conveyor belt. Where the chips are dry or lightly packed, the feed capacity may be increased by increasing the distance between the centres of the screw conveyors.

The above and other objects, advantages and characteristic features of the present invention will be more readily understood from the following detailed description taken in connection with the accompanying drawings, in which:

Fig. 3 is an end view of the apparatus shown in Fig. 1. In this view certain parts have been omitted for the sake of clarity.

Fig. 4 is a detail view partly in elevation and partly in section of a clutch shifter forming part of the assembly shown in the preceding figures.

Figures 1, 2:
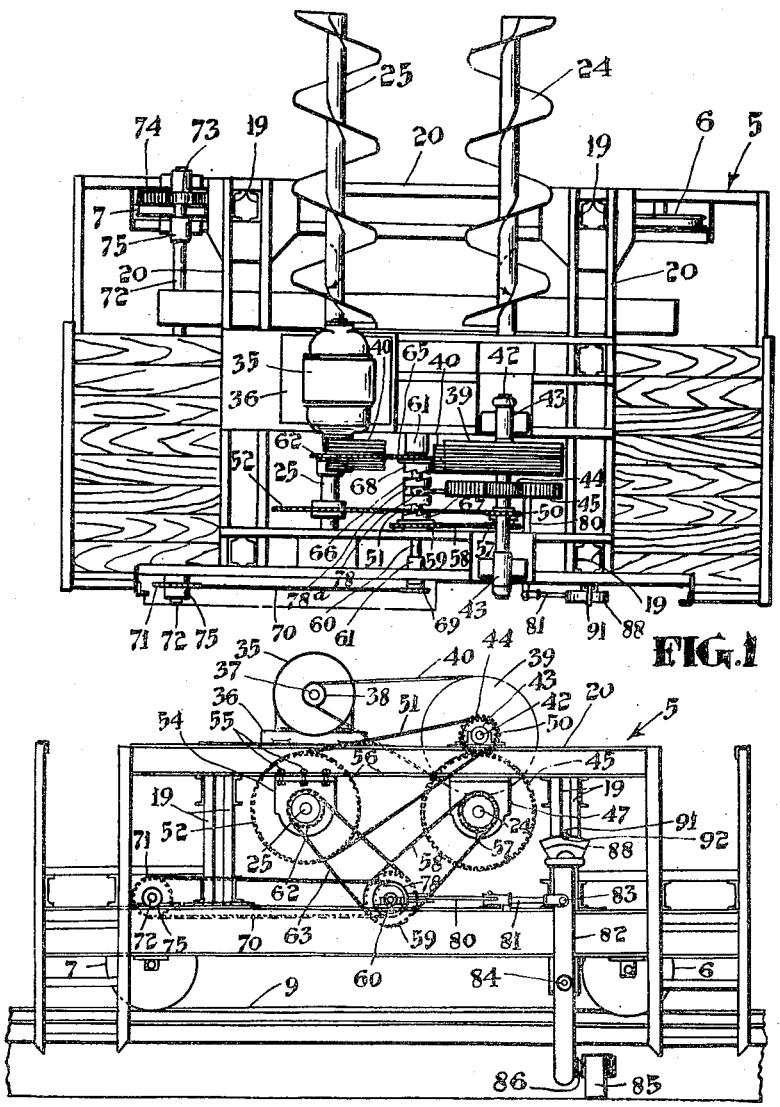
Fig. 1 is a plan view of an apparatus embodying this invention.
Fig. 2 is an elevational view of the apparatus shown in Fig. 1.

Referring more particularly to the drawings, 5 designates a carriage consisting of a steel frame structure carried on sets of front and rear double flanged wheels 6 and 7, each wheel being individually mounted in suitable bearings 8 bolted to the underside of the carriage frame. The carriage is adapted to travel on tracks 9 which straddle an endless conveyor belt 10. The conveying portion of the belt is supported by rolls 11 arranged to form the belt into a trough shape for conveying chips to a digester or boiler furnace (not shown) while the return portion of the belt is supported on straight rolls 12.

The carriage is adapted to be moved in either direction along tracks 9 by means of power driven wheels 7 actuated by driving mechanism, hereinafter more fully described. Tracks 9 are laid alongside of a pulpwood chip storage bin 13 the full length thereof. Bin 13 is provided with a platform 14 extending the length of the bin, said platform being suitably disposed to permit the chips which are extracted from the bin to be carried over the platform for deposit onto the conveyor belt. The marginal portion 15 of platform 14 projects outwardly to overlie the adjacent side of the carriage in overlapping relation to a skirt plate 16 carried by the carriage. Skirt plate 16 is angularly arranged on the carriage in the longitudinal direction and in overlapping relation to the conveyor belt so as to direct the chips to the conveyor belt as they fall from the platform.

Carriage 5 is provided with vertical supporting columns 19 upon which is mounted an upper frame structure 20. Twin screw conveyors 24 and 25 projecting laterally from said carriage are journalled in suitable bearings carried by upper frame structure 20 to rotate, preferably in opposite directions, through actuating means hereinafter described in detail. The projecting portions of screw conveyors 24 and 25 extend into storage bin 13 directly over platform 14. By rotation, the screw conveyors draw the chips over the platform 14 towards its marginal edge 15 to cause the chips to fall through a hopper 27 onto the conveyor belt 10. Hopper 27 is formed by a pair of laterally spaced vertical sidewalls 28 arranged longitudinally in the central portion of the carriage to project downwardly therefrom. The lower marginal portions of sidewalls 28 are provided with flexible skirts 29 which project downwardly in contact engagement with the upper surface of the trough-shaped portion of the conveyor belt. The lower marginal edge of angularly arranged skirt plate 16 is adapted to overlap the upper marginal edge of the adjacent sidewall 28 of hopper 27 to direct the feeding of the chips into the hopper. An adjustable baffle plate 30 is arranged longitudinally of the carriage to project downwardly therefrom intermediate the side walls 28 of hopper 27. Baffle plate 30 is preferably adjustably mounted so that it may be shifted laterally to any desired position of adjustment between the hopper sidewalls 28 for stacking the chips so as to balance the load of chips centrally of the conveyor belt. The position of the baffle will be governed by the flow of chips into the hopper.

A motor 35 is mounted on base plate 36 and is supported on upper frame structure 20 with the base plate arranged for slidable adjustment on said frame structure in the longitudinal direction thereof. Motor shaft 37 provided with a pulley 38 is connected to a drive wheel 39 by means of V-belt 40. Drive wheel 39 is mounted for rotatation on shaft 42 having its ends journalled in bearings 43 carried by frame structure 20. A pinion 44, also mounted on shaft 42, meshes with a second gear 45 to rotate same in a direction counter to the direction of rotation of shaft 42. Gear 45 is mounted on screw conveyor shaft 24 for rotation of same, shaft 24 being journalled in suitable bearings 47, which are suspended from frame structure 20. A sprocket gear 50 mounted for rotation on shaft 42 is connected through chain drive 51 to a sprocket gear 52 mounted on screw conveyor shaft 25 for rotation of said screw conveyor shaft in a direction corresponding to the direction of rotation of shaft 42. Screw conveyor shaft 25 is journalled in suitable bearings 54, bearings 54 being adjustably secured by bolts 55 in suitable holes 56 provided in frame structure 20 so as to permit adjustment of the spacing of the screw conveyors to vary the capacity of the chip feed to conveyor belt 10. When such adjustment is resorted to the chain drive 51 is replaced by a similar chain of suitable length.

From the foregoing it will be seen that shaft 42, driven by motor 35, serves to continuously rotate screw conveyor shafts 24 and 25 in opposite directions at substantially the same rate of speed. Shaft 24 is driven in the one direction through the medium of intermeshing gears 44 and 45, while shaft 25 is driven in a counter direction through the medium of sprocket gears 50 and 52 connected by chain drive 51.

The carriage driving mechanism is powered by the continuously rotating screw conveyor shafts 24 and 25. A sprocket gear 57 fixed to rotate with screw conveyor shaft 24 is connected by chain drive 58 to a sprocket gear 59 mounted for rotation about a shaft 60 in a direction corresponding to the direction of rotation of screw conveyor shaft 24. Shaft 60 is mounted in suitable bearings 61 carried by the frame of carriage 5. Screw conveyor shaft 25 is also provided with a sprocket gear 62 fixed to rotate therewith. A chain drive 63 connects gear 62 with another sprocket gear 65 mounted for rotation about shaft 60 to drive gear 65 in a direction corresponding to the direction of rotation of screw shaft 25 and counter to the direction of rotation of sprocket gear 59. It will be borne in mind that when lateral adjustment of the screw conveyor shaft 25 is resorted to, chain drive 63 will be replaced by a similar chain of suitable length in conjunction with the change-over of the chain drive 51 to a similar chain of suitable length. A jaw clutch 66, interposed between gears 59 and 65, is fixed to rotate with shaft 60. Clutch 66 is slidable in opposite directions along shaft 60 and is adapted to selectively engage the complementary jaws on collars 67 and 68 of gears 59 and 65 respectively. A third sprocket gear 69 is mounted on shaft 60 and is fixed to rotate therewith. Gear 69 is connected by chain drive 70 to a further sprocket gear 71 mounted to rotate a drive shaft 72 journalled in bearings 75. Pinions 73 fixed to rotate with shaft 72 are adapted to mesh with gears 74 suitably mounted to rotate with double flanged driving wheels 7 of the carriage.

Screw conveyor shafts 24 and 25 serve to continuously rotate jaw clutch engaging collars 67 and 68 in opposite directions about a common shaft 60, collar 67 being rotated in the one direction by integrally connected sprocket 59 on shaft 60 which is connected to sprocket 57 on shaft 24 through chain drive 58, and collar 68 being rotated in the opposite direction by integrally connected sprocket 65 on shaft 60 which is connected to sprocket 62 on shaft 25 through chain drive 63. The jaw clutch 66 on shaft 60 is actuated by a lever mechanism, hereinafter more fully described, to selectively engage the rotating collars 67 and 68. When clutch 66 engages with collar 67, shaft 60 is caused to rotate in a direction corresponding to the direction of rotation of screw shaft 24. Through the medium of sprockets 69 and 71, drive shaft 72 causes intermeshing gears 73 and 74 to rotate carriage wheels 7 to move the carriage in one direction along tracks 9. When clutch 66 engages with collar 68, shafts 60 and 72 are caused to rotate in a direction corresponding to the direction of rotation of screw shaft 25 so that gears 73 and 74 will rotate carriage wheels 7 to move the carriage in the opposite direction along tracks 9.

The clutch actuating mechanism comprises a clutch shifting fork 78 arranged to straddle clutch 66 in groove 78a provided therefor. Fork 78 is connected to a bell-crank arm 80 pivotally operable for moving the clutch from left to right to selectively engage with oppositely disposed reversing collars 67 and 68. Bell-crank arm 80 is pivotally connected by link 81 to a substantially vertically disposed reversing bar 82 adjacent the upper end thereof as indicated at 83. Bar 82 is pivotally mounted at a suitable point intermediate its length on the frame of carriage 5 by suitable pivotal means 84. The lower end of bar 82 is projected to be engaged by reversing stop members 85 located adjacent either ends of the tracks 9.

As previously pointed out, when the clutch is engaged with one collar the driving mechanism will cause the carriage to be moved in one direction. When the carriage approaches the end of the line the lower end of bar 82 will be engaged by the spring bumper 86 of stop member 85 at that end of the line. Spring bumper 86 rotates bar 82 about its pivotal axis at 84 causing the upper end of the bar to actuate bell-crank arm 80 to move clutch 66 out of engagement with the aforementioned collar and into engagement with the oppositely disposed collar to reverse the driving mechanism of the carriage. Similarly when the carriage has travelled the line in the opposite direction, bar 82 will be rotated by the spring bumpers of stop member 85 at the other end to reverse the driving mechanism of the carriage. The upper end of bar 82 is provided with a counterweight 88 which is pivotally connected thereto at 89. Counterweight 88 has its lower end mounted for rotation on a shaft 90 carried by column 19. The counterweight serves to maintain the bar in its tilted position when it has been rotated by either stop member to ensure that the clutch will not be accidentally moved out of engagement with the driving mechanism until the bar is counter rotated. When the bar 82 is disposed substantially vertical, the clutch will be mid-way between collars 67 and 68 in a neutral position. Suitable locking lug 91 carried by carriage supporting column may be fitted into slot 92 of the counterweight 88 to secure the clutch in its neutral position.

Having now described what is believed to be the preferred embodiment of this invention, it is to be understood that various changes and modifications may be resorted to without departing from the scope and spirit of this invention as defined in the appended claims.

I claim:

1. A mechanical feeder of the character described comprising, in combination with a storrage compartment and a material conveyor belt, a carriage straddling said conveyor belt and moveable along tracks provided therefor, a pair of screw conveyors mounted for rotation on said carriage and projecting laterally therefrom into said storage compartment, actuating means rotating said screw conveyors in opposite directions for feeding the contents from the storage compartment to the conveyor belt, and a pair of laterally spaced vertically disposed sidewall members adapted to direct the contents being fed from the storage compartment to the conveyor belt.

2. A mechanical feeder as set forth in claim 1, including a baffle interposed between said sidewall members and adapted to be shifted laterally toward either sidewall member to provide a balanced distribution of the material on the conveyor belt.

3. A mechanical feeder of the character described comprising, in combination with a storage compartment and a material conveyor belt, a carriage straddling said conveyor belt and moveable along tracks provided therefor, a pair of screw conveyors mounted for rotation on said carriage and projecting laterally therefrom into said storage compartment, and means for rotating said screw conveyors in opposite directions to feed the contents from the storage compartment to the conveyor belt.

4. A mechanical feeder as set forth in claim 3, in which at least one of said screw conveyors is laterally adjustable to vary the capacity of feed of material from the storage compartment.

5. A mechanical feeder of the character described comprising, in combination with a storage bin and a material conveyor belt arranged for independent travel adjacent said storage bin, a carriage straddling said conveyor belt and moveable along tracks provided therefor, a pair of screw conveyors mounted for rotation on said carriage and projecting laterally therefrom into the storage bin, means mounted on said carriage for rotating said screw conveyors in opposite directions and further actuating means for moving said carriage relative to said conveyor belt.

6. A mechanical feeder as set forth in claim 5, in which said screw conveyor rotating means comprises a motor mounted on said carriage having a shaft and a pulley rotatably mounted on said shaft, a power transmission shaft mounted for rotation on said carriage and having a pulley rotatable therewith, a belt drive connecting said motor pulley with said power transmission shaft pulley for rotation of said shaft, a pinion gear mounted for rotation with said power transmission shaft, a second gear mounted on one of said screw conveyors and meshing with the pinion gear for rotation of said screw conveyor in a direction counter to the direction of rotation of the power transmission shaft, a sprocket wheel carried by said power transmission shaft for rotation therewith, a second sprocket wheel carried by the other screw conveyor for rotation of same, and a chain drive connecting said first and second sprocket wheels for rotation of said last mentioned screw conveyor in a direction complementary to the rotation of said power transmission shaft.

7. A mechanical feeder as set forth in claim 5, in which said means for moving the carriage comprises a drive shaft mounted for rotation on said carriage, a pair of laterally spaced clutch-engaging collars mounted for rotation about said shaft and adapted to be reversely rotated by said oppositely rotating screw conveyors, a clutch member interposed between said collars and mounted on said shaft for rotation with same, said clutch being slidable on said shaft for selective engagement with the reversely rotating collars, a pair of driving wheels attached to said carriage for supporting said carriage on the tracks, said wheels being geared to said drive shaft for conveying the carriage in opposite directions along said tracks.

8. A mechanical feeder as set forth in claim 1, including a guide plate mounted on said carriage and interposed between the storage compartment and the adjacent sidewall for directing the material to the conveyor belt.

9. A mechanical feeder as set forth in claim 7, including a clutch shifting mechanism comprising a clutch shifting bar pivotally mounted on said carriage, a stop member mounted to engage one end of the bar for rotation of said bar about its pivotal axis, a bell-crank pivotally mounted on said carriage, said bell-crank having one end linked to the clutch for shifting same and the other end linked to said bar whereby the rotation of said bar serves to actuate said bell-crank for shifting the clutch into and out of engagement with the oppositely rotating clutch engaging collars.

10. A mechanical feeder as set forth in claim 7, including a clutch shifting mechanism comprising a clutch shifting bar pivotally mounted on said carriage, a stop member mounted to engage one end of the bar for rotation of said bar about its pivotal axis, a bell-crank pivotally mounted on said carriage, said bell-crank having one end linked to the clutch for shifting same and the other end linked to said bar whereby the rotation of said bar serves to actuate said bell-crank for shifting the clutch into and out of engagement with the oppositely rotating clutch engaging collars, and a counterweight pivotally connected to said shifting bar and adapted to maintain the rotated bar in its position predetermined by the stop member until counter-rotated by a second stop member to thereby prevent accidental disengagement of the carriage actuating means.

11. A mechanical feeder of the character described comprising an endless material conveyor belt, a carriage straddling said conveyor belt and movable along tracks provided therefor, a pair of screw conveyors mounted for rotation on said carriage and projecting laterally therefrom to deliver material to the endless conveyor from a storage pile at one side of said endless conveyor, and means rotating said screw conveyors in opposite directions for feeding the contents between said conveyors from the storage pile to the endless conveyor.

12. A mechanical feeder as set forth in claim 11, in which at least one of said conveyors is laterally adjustable to vary the capacity of feed of material from the storage pile to the endless conveyor.

13. A mechanical feeder as set forth in claim 11, including further actuating means operable by said screw conveyor rotating means for moving said carriage relative to said endless conveyor belt.

14. A mechanical feeder as set forth in claim 11, in which said screw conveyor rotating means comprises a motor mounted on said carriage having a shaft and a pulley rotatably mounted on said shaft, a power transmission shaft mounted for rotation on said carriage and having a pulley rotatable therewith, a belt drive connecting said motor pulley with said power transmission shaft pulley for rotation of said shaft, a pinion gear mounted for rotation with said power transmission shaft, a second gear mounted on one of said screw conveyors and meshing with the pinion gear for rotation of said screw conveyor in a direction counter to the direction of rotation of the power transmission shaft, a sprocket wheel carried by said power transmission shaft for rotation therewith, a second sprocket wheel carried by the other screw conveyor for rotation of same, and a chain drive connecting said first and second sprocket wheels for rotation of said last mentioned screw conveyor in a direction complementary to the rotation of said power transmission shaft.

15. A mechanical feeder as set forth in claim 13, in which said further actuating means for moving said carriage comprises a drive shaft mounted for rotation on said carriage, a pair of laterally spaced clutch-engaging collars mounted for rotation about said shaft and adapted to be reversely rotated by said oppositely rotating screw conveyors, a clutch member interposed between said collars and mounted on said shaft for rotation with same, said clutch being slidable on said shaft for selective engagement with the reversely rotating collars, a pair of driving wheels attached to said carriage for supporting said carriage on the tracks, said wheels being geared to said drive shaft for conveying the carriage in opposite directions along said tracks.

16. A mechanical feeder as set forth in claim 13, in which said further actuating means for moving said carriage comprises a drive shaft mounted for rotation on said carriage, a pair of laterally spaced clutch-engaging collars mounted for rotation about said shaft and adapted to be reversely rotated by said oppositely rotating screw conveyors, a clutch member interposed between said collars and mounted on said shaft for rotation with same, said clutch being slidable on said shaft for selective engagement with the reversely rotating collars, a pair of driving wheels attached to said carriage for supporting said carriage on the tracks, said wheels being geared to said drive shaft for conveying the carriage in opposite directions along said tracks, a clutch shifting mechanism comprising a clutch shifting bar pivotally mounted on said carriage, a stop member mounted to engage one end of the bar for rotation of said bar about its pivotal axis, a bell-crank pivotally mounted on said carriage, said bell-crank having one end linked to the clutch for shifting same and the other end linked to said bar whereby the rotation of said bar serves to actuate said bell-crank for shifting the clutch into and out of engagement with the oppositely rotating clutch engaging collars.

17. Apparatus for feeding material from one or more storage bins provided with a bottom opening comprising a horizontal platform underlying the bottom opening of the bin or bins and adapted to receive and support the material delivered to the bin opening, an endless conveyor positioned below and extending along said platform with one marginal portion of the conveyor underlying one edge of the platform, tracks arranged on opposite sides of said endless conveyor and extending longitudinally thereof, a carriage including a frame structure overlying said endless conveyor and underlying said platform, supporting wheels supporting said frame and running on said tracks, and conveying means mounted on said frame and projecting laterally therefrom so that said conveying means extends transversely across the upper surface of the platform, said conveying means being operable to convey the material on the platform to and over the edge of the platform overlying the endless conveyor.

18. Apparatus as set forth in claim 17, including laterally spaced side wall members extending downwardly from the frame into close proximity with the upper flight of the endless conveyor, one of said side wall members being positioned below and immediately adjacent the edge of the platform overlying the endless conveyor.

19. Apparatus as set forth in claim 18, including a guide plate mounted on said frame and interposed between said platform and the adjacent side wall for directing the material from said platform to the space made by the said side walls.

20. Apparatus as set forth in claim 18, including a baffle interposed between and extending parallel with said laterally spaced side wall members, said baffle being adjustably secured to said frame by means permitting it to be adjusted laterally with respect to said side wall members.

21. Apparatus as set forth in claim 17, in which the conveying means mounted on said frame comprises a pair of screw conveyors mounted for rotation and a prime mover mounted on and movable with said carriage and operable to rotate said screw conveyors in opposite directions for conveying the material between said conveyors on the platform to and over the edge of the platform overlying the endless conveyor.

22. Apparatus as set forth in claim 21, including means mounted on said carriage and operable by said prime mover for moving said carriage relative to the endless conveyor.

ALFRED T. HURTER.

REFERENCES CITED

The following references are of record in the file of this patent:

UNITED STATES PATENTS

| Number | Name | Date |
| --- | --- | --- |
| 668,130 | Kincaid | Feb. 12, 1901 |
| 738,013 | Dodge | Sept. 1, 1903 |
| 892,593 | Keller | July 7, 1908 |
| 1,268,911 | Ziesing | June 11, 1918 |
| 1,310,454 | Stuart | July 22, 1919 |
| 1,564,926 | Armstrong | Dec. 8, 1925 |
| 1,570,085 | Saxe | Jan. 19, 1926 |
| 2,110,207 | Doran | Mar. 8, 1938 |
| 2,417,823 | Hodson | Mar. 25, 1947 |

FOREIGN PATENTS

| Number | Country | Date |
| --- | --- | --- |
| 23,285 | Denmark | July 22, 1918 |
| 567,267 | Germany | Dec. 30, 1932 |